US012307515B2

United States Patent
Shigaki

(10) Patent No.: US 12,307,515 B2
(45) Date of Patent: *May 20, 2025

(54) SECURE DECENTRALIZED SYSTEM AND METHOD

(71) Applicant: Devon Shigaki, Bellevue, WA (US)

(72) Inventor: Devon Shigaki, Bellevue, WA (US)

(73) Assignee: FreshCredit, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/345,804

(22) Filed: Jun. 30, 2023

(65) Prior Publication Data

US 2024/0127332 A1   Apr. 18, 2024

Related U.S. Application Data

(62) Division of application No. 17/897,018, filed on Aug. 26, 2022, now Pat. No. 12,236,480.

(60) Provisional application No. 63/237,137, filed on Aug. 26, 2021.

(51) Int. Cl.
*G06Q 40/00* (2023.01)
*G06Q 30/0201* (2023.01)
*G06Q 40/03* (2023.01)

(52) U.S. Cl.
CPC ......... *G06Q 40/03* (2023.01); *G06Q 30/0201* (2013.01)

(58) Field of Classification Search
None
See application file for complete search history.

(56) References Cited

U.S. PATENT DOCUMENTS

| | | | |
|---|---|---|---|
| 9,298,806 B1 | 3/2016 | Vessenes et al. | |
| 9,715,541 B1 | 7/2017 | Kosslyn et al. | |
| 9,792,648 B1 | 10/2017 | Haller et al. | |
| 9,898,780 B2 | 2/2018 | Bornhofen et al. | |
| 9,922,326 B2 | 3/2018 | Alexander, IV et al. | |

(Continued)

OTHER PUBLICATIONS

Jacob Eberhardt, et al., "On or Off the Blockchain? Insights on Off-Chaining Computation and Data;" International Conference on Computer Analysis of Images and Patterns (CAIP), Berlin, Sep. 1, 2017, pp. 3-15, XP047446752.

(Continued)

*Primary Examiner* — Olabode Akintola
(74) *Attorney, Agent, or Firm* — Gary L. Eastman, Esq.; Eastman IP

(57) ABSTRACT

A node associated with an individual and/or organization receives a storage identifier for new data associated with a consumer and/or business. A node and distributed data sources are used to share the new consumer and/or business data with a network of nodes. The node updates a node with the storage identifier for the new consumer and/or business data. The node receives, from a device associated with the individual and/or organization, a request for the new data. The node obtains the storage identifier for the new data from the node. The node obtains the new data by using the storage identifier to search the distributed data sources. The node provides the new consumer and/or business data to the device. The node performs actions to obtain additional new consumer and/or business data from the distributed data sources or provide the additional new consumer and/or business data to the distributed data sources.

6 Claims, 10 Drawing Sheets

(56) References Cited

U.S. PATENT DOCUMENTS

| | | |
|---|---|---|
| 10,095,888 B1 | 10/2018 | Lee et al. |
| 10,496,850 B1 | 12/2019 | Lee et al. |
| 2005/0068571 A1 | 3/2005 | Gerhart et al. |
| 2016/0140655 A1* | 5/2016 | Sahgal ................. G06Q 40/03 705/38 |
| 2016/0342976 A1 | 11/2016 | Davis |
| 2016/0342977 A1 | 11/2016 | Lam |
| 2018/0034804 A1 | 2/2018 | Steiner |
| 2018/0075527 A1* | 3/2018 | Nagla ................ G06F 21/6218 |
| 2019/0102837 A1 | 4/2019 | Smith et al. |
| 2019/0147431 A1 | 5/2019 | Galebach et al. |
| 2019/0180274 A1 | 6/2019 | Johnson |
| 2019/0188657 A1 | 6/2019 | Arora et al. |
| 2019/0236565 A1 | 8/2019 | Song et al. |
| 2020/0160319 A1* | 5/2020 | Smith .................... G06Q 20/36 |
| 2020/0211099 A1* | 7/2020 | Smith .................... H04L 63/126 |
| 2022/0353077 A1* | 11/2022 | Oluyemi ................ G06F 21/41 |

OTHER PUBLICATIONS

Melanie Swan, "Blockchain Blueprint for a New Economy," Jan. 22, 2015, pp. 19-65, XP055406241, [Restrieved on Sep. 13, 2017] Retrieved from the internet [URL: http://w2.blockchain-tec.net/blockchain/blockchain-by-melanie-swan.pdf].

Gavin Woods; "Polkadot: Vision for a Heterogeneous Multi Chain Framework;" https://polkadot.network/PolkaDotPa-per.pdf.

"Parachains," Poladot Wiki, https://wiki.polkadot.netowrk/docs/learn-para-chains.

* cited by examiner

500

510
Receive, by a first node associated with a first individual and/or organization, a storage identifier for new consumer and/or business data associated with a consumer and/or business, where in a node and a set of distributed data sources are used to share the new consumer and/or business data with a network of nodes that are associated with a group of individuals and/or organizations that are permitted to access the new consumer and/or business data, wherein the storage identifier is used to identify a storage location at which the new consumer and/or business data is to be stored within the set of distributed data sources, and wherein the new consumer and/or business data has been provided to the set of distributed data sources by a second node associated with a second individual and/or organization of the group of individuals and/or organizations

520
Update a node associated with the individual and/or organization to include the storage identifier for the new consumer and/or business data

530
Receive, from a device associated with the first individual and/or organization, a request for the new consumer and/or business data

540
Obtain the storage identifier for the new consumer and/or business data from the node, wherein obtaining the storage identifier from the node causes the node to provide digital currency associated with the first individual and/or organization to an account associated with the second individual and/or organization

550
Obtain the new consumer and/or business data by using the storage identifier to search the set of distributed data sources

560
Provide the new consumer and/or business data to the device associated with the first individual and/or organization

570
Perform a group of actions associated with obtaining additional new consumer and/or business data from the set of distributed data sources or providing the additional new consumer and/or business data to the set of distributed data sources

FIG. 5

SECURE DECENTRALIZED SYSTEM AND METHOD

RELATED APPLICATIONS

This application is a divisional of U.S. Utility patent application Ser. No. 17/897,018 for a "Secure Decentralized System," filed Aug. 26, 2022, and currently copending, which claims priority to U.S. Provisional Patent Application Ser. No. 63/237,137 for a "Secure decentralized system utilizing a node, a network of nodes, and/or a distributed file system", filed Aug. 26, 2021. The entirety of the aforementioned related applications is incorporated herein by reference.

FIELD OF THE INVENTION

Computer software in the field of credit scoring for use in creating and implementing business decision processes, risk management, evaluating credit ratings, score computation, score strategy and management and credit marketing in the field of financial services, insurance, telecommunications and retail industries.

BACKGROUND OF THE INVENTION

A blockchain is a distributed database that maintains a continuously growing list of records, called blocks, that may be linked together to form a chain. Each block in the blockchain may contain a timestamp and a link to a previous block and/or transaction. The blocks may be secured from tampering and revision. In addition, a blockchain may include a secure transaction ledger database shared by parties participating in an established, distributed network of computers. A blockchain may record a transaction (e.g., exchange or transfer of information) that occurs in the network, thereby reducing or eliminating the need for trusted/centralized third parties. In some cases, the parties participating in a transaction may not know the identities of any other parties participating in the transaction but may securely exchange information.

A parachain node is an application-specific data structure that is globally coherent and may be validated by the validators of a relay chain. Most commonly, a parachain node will take the form of a blockchain, but there is no specific need for them to be actual blockchains. Parachains take their name from the concept of parallelized chains that run parallel to the relay chain, which is also a parachain. Due to their parallel nature, they are able to parallelize transaction processing and achieve scalability of the system. They share in the security of the network and can communicate with other parachains using, crosschain messaging (XCMP). Further, the parachain node may correspond to a record of consensus with a cryptographic audit trail that is maintained and validated by a set of individual computers.

SUMMARY OF THE INVENTION

According to some preferred embodiments of the Secure Decentralized System Utilizing a Node, A Network of nodes, and/or a Distributed File System, otherwise referred to as the "Secure Decentralized System" of the present invention, a first node includes one or more memories and one or more processors that are communicatively connected to the one or more memories. The one or more processors are capable of receiving new consumer and/or business data of a consumer and/or business that has credit with a first individual and/or organization. A node and a set of distributed data sources are used to share the new consumer and/or business data with a network of nodes that are associated with a group of individuals and/or organizations that are permitted to access the new consumer and/or business data. The one or more processors generate a storage identifier for the new consumer and/or business data by executing a mapping function. Some embodiments of the storage identifier identify a storage location at which the new consumer and/or business data is to be stored within the set of distributed data sources. In some embodiments, the one or more processors provide the storage identifier for the new consumer and/or business data to a node associated with the consumer and/or business. The node may be supported by the node. In some embodiments, the one or more processors broadcast the storage identifier for the new consumer and/or business data to the network of nodes to cause a second node, of the network of nodes, to provide the storage identifier for the new consumer and/or business data to a node that is accessible to the second node. Broadcasting the storage identifier permits the second node, based on a request from a device associated with a second individual and/or organization, to obtain the new consumer and/or business data, obtain the storage identifier for the new consumer and/or business data from the node, use the storage identifier to obtain the new consumer and/or business data from the set of distributed data sources, provide the new consumer and/or business data to the device associated with the second individual and/or organization, and provide digital currency associated with the second individual and/or organization to an account associated with the first individual and/or organization. In some embodiments, the one or more processors perform a group of actions associated with obtaining additional new consumer and/or business data from the set of distributed data sources or providing the additional new consumer and/or business data to the set of distributed data sources.

According to some preferred embodiments, a method includes receiving, by a first node that is associated with a first individual and/or organization, a storage identifier for new consumer and/or business data associated with a consumer and/or business. A node and a set of distributed data sources are used to share the new consumer and/or business data with a network of nodes that are associated with a group of individuals and/or organizations that are permitted to access the new consumer and/or business data. The storage identifier is used to identify a storage location at which the new consumer and/or business data is to be stored within the set of distributed data sources. In some embodiments, the new consumer and/or business data is provided to the set of distributed data sources by a second node associated with a second individual and/or organization of the group of individuals and/or organizations. Some embodiments of the method include updating, by the first node, a node associated with the consumer and/or business to include the storage identifier for the new consumer and/or business data. Some embodiments of the method include receiving, by the first node and from a device associated with the first individual and/or organization, a request for the new consumer and/or business data. Some embodiments of the method include obtaining, by the first node, the storage identifier for the new consumer and/or business data from the node. In some embodiments, obtaining the storage identifier from the node causes the node to provide digital currency associated with the first individual and/or organization to an account associated with the second individual and/or organization. Some embodiments of the method include obtaining, by the first node, the new consumer and/or business data by using the storage identifier to search the set of distributed data sources. Some embodiments of the method include providing, by the first node, the new consumer and/or business data to the device associated with the first individual and/or organization. Some embodiments of the method include performing, by the first node, a group of actions associated with obtaining additional new consumer and/or business data from the set of distributed data sources or providing the additional new consumer and/or business data to the set of distributed data sources.

According to some preferred embodiments, a non-transitory computer-readable medium stores one or more instructions that, when executed by one or more processors, cause the one or more processors to receive new consumer and/or business data of a consumer and/or business that has credit with a first individual and/or organization. A node and a set of distributed data sources are used to share the new consumer and/or business data with a network of nodes that are associated with a group of individuals and/or organizations that are permitted to access the new consumer and/or business data. The one or more instructions cause the one or more processors to provide a storage identifier for the new consumer and/or business data to a node associated with the consumer and/or business. The node may be supported by the node, meaning that the node does not rely on off chain resources to compute. The storage identifier is used to identify a storage location at which the new consumer and/or business data is to be stored within the set of distributed data sources. The one or more instructions cause the one or more processors to provide the new consumer and/or business data and the storage identifier to the set of distributed data sources. In some embodiments, the new consumer and/or business data is stored in association with the storage identifier. The one or more instructions cause the one or more processors to broadcast the storage identifier for the new consumer and/or business data to the network of nodes to cause a particular node, of the network of nodes, to add the storage identifier for the new consumer and/or business data to a node that is accessible to the particular node. Broadcasting the storage identifier permits the particular node to, based on a request for the new consumer and/or business data by a second individual and/or organization, obtain the storage identifier for the new consumer and/or business data from the node, use the storage identifier to obtain the new consumer and/or business data from the set of distributed data sources, provide the new consumer and/or business data to an interface associated with the second individual and/or organization, and provide digital currency associated with the second individual and/or organization to an account associated with the first individual and/or organization. The one or more instructions cause the one or more processors to perform a group of actions associated with obtaining additional new consumer and/or business data from the set of distributed data sources and/or providing the additional new consumer and/or business data to the set of distributed data sources.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIGS. 4-6 are flow charts of an example process for sharing commercial actor data of a commercial actor among a network of nodes that have access to a node, a node associated with the commercial actor, and a distributed file system.

DETAILED DESCRIPTION

Figure 1A:
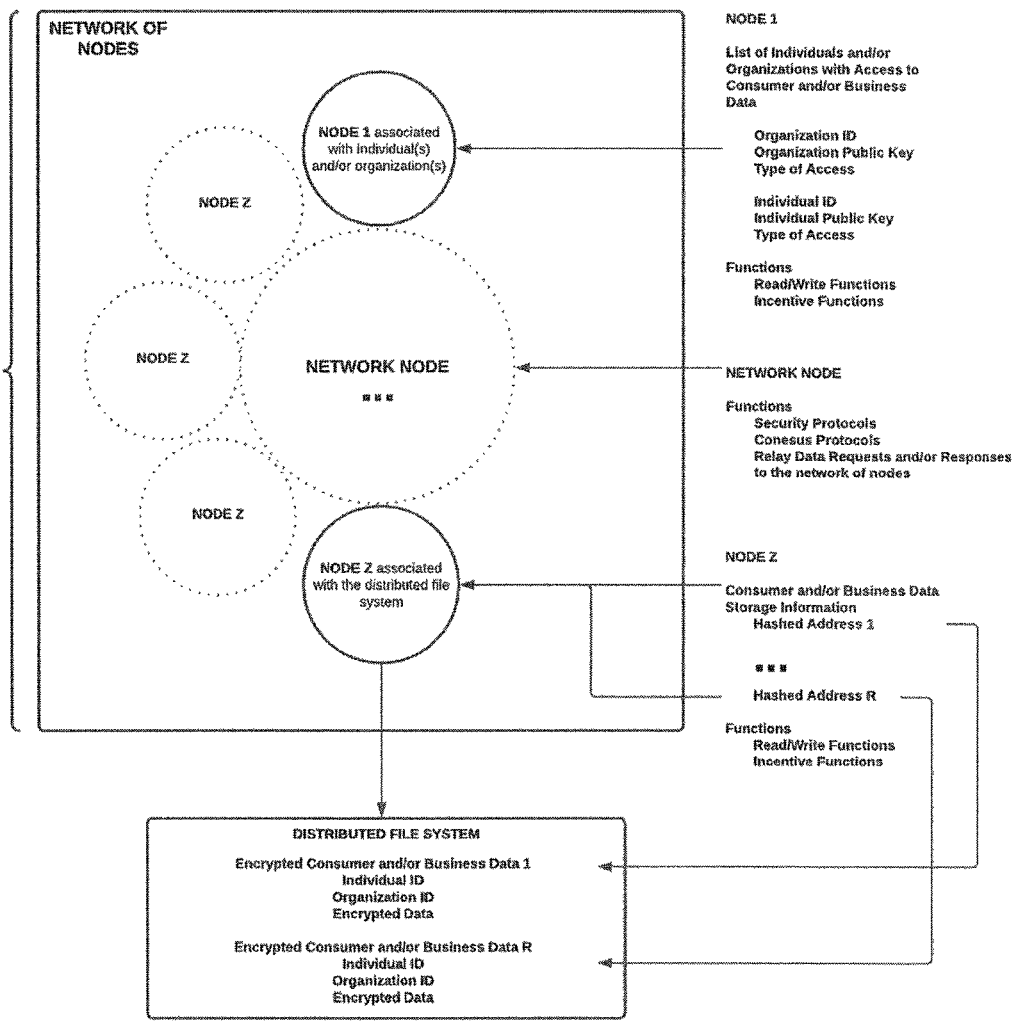
FIGS. 1A-1E are diagrams of an example implementation described herein.

The following detailed description of example implementations refers to the accompanying drawings. The same reference numbers in different drawings identify the same or similar elements.

As used herein, "entity" or "entities" refers to individuals, organizations, or both individuals and organizations. The relationship between an individual and the organization is the governing framework of the network of individuals and organizations validating network data.

As used herein, "commercial actor" or "commercial actors" refers to consumers, businesses, or both consumers and businesses. The relationship between the consumer and business is a risk assessment process in order to engage in services related to risk based offers.

A reporting agency may collect data relating to commercial actors, and a group of entities may pay the reporting agency to access the data. For example, a credit reporting agency may collect commercial actor data of commercial actors, and a group of entities (e.g., crowdfunded, financial institutions, etc.) may pay the credit reporting agency to access the commercial actor data. In this case, each entity may independently provide the commercial actor data of the commercial actors to the credit reporting agency, thus allowing the credit reporting agency to serve as a singular source of commercial actor data, and to charge entities to access the commercial actor data.

However, the credit reporting agency may not provide the entities with any consideration for initially providing the credit reporting agency with the commercial actor data. Furthermore, providing commercial actor data to credit reporting agencies creates security and/or privacy concerns. For example, a credit reporting agency may resell the commercial actor data of the commercial actor without the knowledge or consent of the commercial actor or the entity providing the commercial actor data of the commercial actor, may have a security breach that allows an unauthorized user to obtain the commercial actor data, and/or the like.

In some cases, a node is used to store commercial actor data for commercial actors. A node is a distributed database that maintains a continuously-growing list of records, called blocks, that may be linked together to form a chain. Each block in the node may contain a timestamp and a link to a previous block and/or transaction. The blocks may be secured from tampering and revision.

Additionally, a node may include a secure transaction ledger database shared by parties participating in an established, distributed network of computers. A node may record a transaction (e.g., an exchange or transfer of information) that occurs in the network, thereby reducing or eliminating the need for trusted/centralized third parties. Further, the node may correspond to a record of consensus with a cryptographic audit trail that is maintained and validated by a set of independent computers.

However, using the node to store commercial actor data of commercial actors may create scalability issues when large quantities of commercial actor data are considered. Furthermore, without an adequate system for incentivizing entities to continue to update the node with the commercial actor data of commercial actors, the node may not be a reliable source of updated commercial actor data of commercial actors.

Some implementations described herein include a first node, of a network of nodes, that is able to share commercial actor data of a commercial actor by utilizing a node supported by a node, a node associated with the commercial actor, a distributed file system. Additionally, some implementations described herein may also provide a mechanism for incentivizing entities to use the node and the distributed file system to share the commercial actor data, as described further herein. In this way, the first node is able to facilitate the distribution of the commercial actor data in a manner that is secure, distributed, automated, and incentive-driven.

For example, security is provided by supporting the node with a tamper-resistant data structure (e.g., the parachain), by implementing various forms of authentication, by restricting access to the network of nodes to particular entities or parties, and/or the like. To provide a few particular examples, the node may improve security by preserving an immutable record of the commercial actor data, by using cryptographic links between blocks of the node (e.g., reducing the potential for unauthorized tampering with the commercial actor data), and/or the like. Security is further improved as a result of nodes that have access to the node independently verifying each transaction that is added to the node. Moreover, use of a node also provides failover protection, in that the first node may continue to operate in a situation where one or more other nodes that have access to the node fail.

Furthermore, by incentivizing entities to update the distributed file system with new commercial actor data, the commercial actor data may serve as a reliable indicator of credit worthiness of the commercial actor. Still further, the first node conserves processing resources and/or network resources and/or memory resources. For example, the first node conserves processing resources and/or network resources that might otherwise be used to query a set of credit bureau data sources to obtain commercial actor data of the commercial actor. As another example, by utilizing a distributed file system to store the commercial actor data, the network of nodes improves in scalability, and conserves memory resources that might otherwise be used to attempt to store the commercial actor data on the node.

FIGS. 1A-1E are diagrams of an example implementation 100 described herein. For example, example implementation 100 may include a network of nodes that are associated with a group of entities that share commercial actor data of a commercial actor using a node supported by a node, a node specific to the commercial actor, a distributed file system. Additionally, in some cases, the network of nodes implements a mechanism for incentivizing the group of entities to use the node and the distributed file system to share commercial actor data.

As shown in FIG. 1A, and by reference number 102, the commercial actor data of the commercial actor may be shared among the group of entities that are permitted to access the commercial actor data. the commercial actor may have a credit history with the group of entities and/or may request credit from the group of entities. The group of entities may include financial institutions, lending institutions, entities with data that may be useful for determining a credit score (e.g., entities that rate the commercial actor, such as entities that provide online-purchasing platforms, ride sharing entities, etc.), and/or the like. In some cases, the group of entities may be limited to lending entities, may exclude credit reporting agencies, and/or the like.

The commercial actor data may include credit events data (e.g., data indicating whether a payment was made, whether a payment was timely, etc.), credit scoring data (e.g., a credit score determined by a particular entity), data that may be used to determine a credit score (e.g., data identifying an income, length of employment, number of open lines of credit, an amount of outstanding debt, a mortgage payment history, assets; physical and/or digital asset holdings, verified IoT devices, complaints, revenue, etc.), and/or the like.

In some implementations, the commercial actor data of the commercial actor is shared using the network of nodes (shown as Node 1 through the Network Node to Node Z). For example, the network of nodes may support the node, which may include a set of blocks that store the commercial actor data and/or information associated with the commercial actor data as blocks in the node.

In some implementations, the node for the commercial actor is stored as a block within the node. In some implementations, data included as part of the node is stored as separate blocks within the node. In some implementations, the network of nodes accesses the node by searching a particular storage location within the node. In some implementations, each node in the network of nodes may store a node, as described further herein.

The node may include information identifying a list of entities that the commercial actor has given permission to access the commercial actor data, storage information for particular commercial actor data, one or more functions associated with obtaining the commercial actor data or providing new commercial actor data, an incentives function associated with creating incentives for the group of entities to continue to use the network of nodes to obtain the commercial actor data or to provide new commercial actor data. The information identifying the list of entities may include an entity identifier (ID) for an entity, a public key associated with each entity that has been given permission to access the commercial actor data, information indicating a type of access (e.g., an entity may be permitted to read the commercial actor data, write (e.g., add new, modify existing, etc.) the commercial actor data, etc.), and/or the like. The storage information for particular commercial actor data may include a storage identifier that serves as an association (e.g., a pointer) to a memory location where the commercial actor data is stored within the distributed file system (shown as Hashed Address 1 through Hashed Address R), as described further herein.

The functions associated with obtaining the commercial actor data or providing new commercial actor data may include a read function (e.g., to process requests by entities that request to read the commercial actor data), a write function (e.g., to process requests by entities that request to write the commercial actor data), and/or the like. The incentives function may require that tokens (e.g., cryptocurrency) be provided to perform the functions associated with obtaining the commercial actor data or providing new commercial actor data. For example, for an entity (e.g., a financial institution) to read particular commercial actor data, the entity may have to pay tokens to another entity (e.g., another financial institution) that wrote the particular commercial actor data into the node.

The distributed file system may be supported by the network of nodes and/or may be supported by one or more third-party entities. For example, the node may be unable to support large quantities of commercial actor data (e.g., gigabytes of commercial actor data, terabytes of commercial actor data, etc.). In this case, the distributed file system may be used to handle data storage for the commercial actor data, and may store the commercial actor data using one or more data structures, such as a tree (e.g., a binary search tree (BST), a red-black (RB) tree, a B-tree, etc.), a graph, a distributed database, a hash table, a linked list, and/or the like. Additionally, the node may store storage identifiers (e.g., hashed addresses) for particular commercial actor data, where the storage identifiers serve as pointers to memory locations at which the particular commercial actor data is stored within the distributed file system.

In this way, the commercial actor and the group of entities are able to securely share the commercial actor data of the commercial actor using the node, the node, and the distributed file system.

Figure 1B:
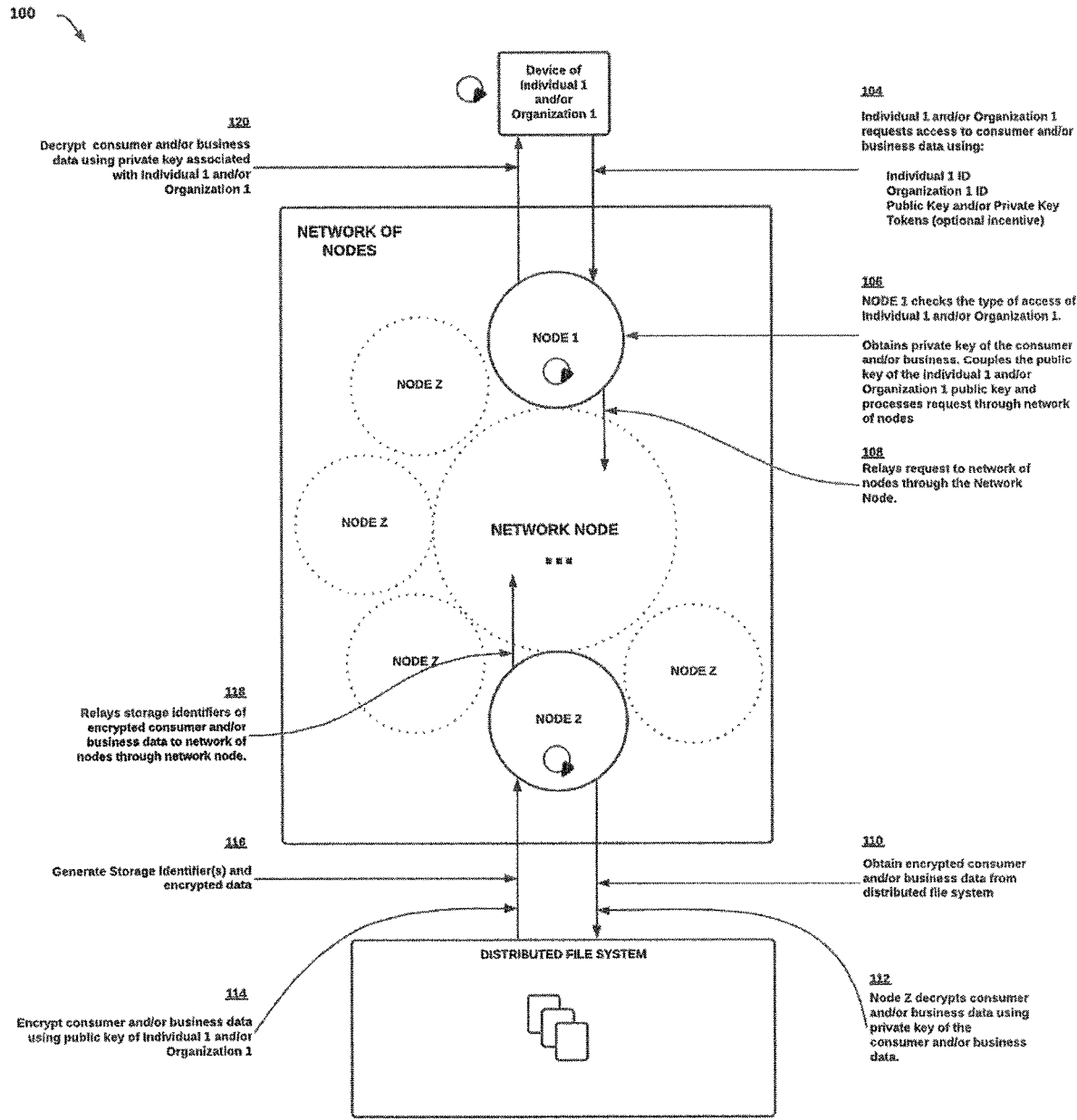

As shown in FIG. 1B, and by reference number 104, a device associated with a first entity (shown as Device of individual 1 and/or organization 1) may provide, to a first node, a request to access the commercial actor data of the commercial actor. For example, the commercial actor may have applied for credit with the first entity, which may have caused the first entity to request access to the commercial actor data of the commercial actor.

As shown by reference number 106, The request may include an entity ID for the first entity, a public key associated with the first entity, one or more tokens, and/or the like. The public key may be part of a key pair (e.g., the public key and a corresponding private key) that are associated with the first entity, whereby the private key is only accessible to the first entity and may be used to decrypt data, and the public key may be provided to other parties and may be used to encrypt data. In some cases, the first entity may compensate an entity for the commercial actor data, in which case tokens may be provided as part of the request.

As shown by reference number 108, the first node may interact with the distributed file system to obtain encrypted commercial actor data of the commercial actor through the network node. The network node may interact with the network of nodes to interact with distributed file system to obtain encrypted commercial actor data of the commercial actor. For example, to be approved for the credit, the commercial actor may instruct the first node to obtain the encrypted commercial actor data. In this case, the first node may obtain the storage identifiers of the commercial actor data (e.g., the hashed addresses) through the network node from a second node, and may use the storage identifiers to search the distributed file system to obtain the encrypted commercial actor data.

As shown by reference number 110, the second node is able to receive a request for the commercial actor data of the commercial actor, and is able to interact with the distributed file system to obtain the commercial actor data.

As shown by reference number 112, the second node may use a private key to decrypt the commercial actor data. For example, the first node may store a private key that is accessible only to the entity, which may be used for decrypting the commercial actor data. The private key may be associated with one or more public keys, which may be distributed to entities that are permitted to access the commercial actor data, and which may be used for encrypting the commercial actor data, as described further herein.

As shown by reference number 114, the second node may encrypt (i.e., re-encrypt) the commercial actor data using the public key of the first entity. For example, the second node may use the public key that was included in the request to encrypt the commercial actor data.

As shown by reference number 116, the second node may generate a set of storage identifiers for the encrypted commercial actor data. For example, the second node may execute a mapping function, such as a hash function, that is able to generate a set of hash values for the commercial actor data. As described above, a hash value may serve as a storage identifier (e.g., an address) that is able to be used as a pointer to a memory location within the distributed file system. In some cases, the second node may generate a single hash value, which may serve as a storage identifier to a memory location that may be used to identify all of the commercial actor data. In some cases, the second node may generate a set of hash values, where each of the set of hash values may serve as storage identifiers to respective memory locations that may be used to identify corresponding portions of the commercial actor data.

As shown by reference number 118, the second node may provide the set of storage identifiers and the encrypted commercial actor data to the distributed file system.

Furthermore the second node may provide the set of storage identifiers to be stored as part of the node of the commercial actor. For example, the second node may have access to a first node of the commercial actor, and may update the first node with the set of storage identifiers. Additionally, the first node may broadcast the set of storage identifiers to the network of nodes to allow each of the network of nodes to update each node with the set of storage identifiers. Furthermore, the node of the commercial actor may be used to store the set of storage identifiers in a list, whereby each storage identifier, of the set of storage identifiers, is an address to particular commercial actor data (e.g., each credit event associated with the commercial actor may have a different storage identifier).

In this way, the set of storage identifiers may be stored as part of the node, such that an entity with access to the node may be able to obtain and use the set of storage identifiers to identify memory locations within the distributed file system that store the encrypted commercial actor data, as described further herein.

As shown by reference number 120, the first node may provide, to the device of the first entity, a notification indicating that the request to access the commercial actor data of the commercial actor has been granted. For example, the first entity may be added to the list of entities permitted to access the commercial actor data (e.g., which is stored as part of the node).

Furthermore, the message granting the request may indicate that the first entity is permitted to utilize a read function of the node, which may be used to read the commercial actor data. In some cases, the first entity may not be permitted to utilize a write function of the node until the first entity provides the commercial actor with credit, as described further herein.

As shown by reference number 120, the device of the first entity may obtain the set of storage identifiers identifying addresses to memory locations used to store the encrypted commercial actor data. For example, the device of the first entity may search the node to identify the set of storage identifiers. In this case, the node may associate the set of storage identifiers with entity identifiers of entities that provided particular commercial actor data and with public keys associated with the entities.

In some implementations, rather than access the node directly, the device associated with the first entity is assigned a particular node, and the particular node may obtain the set of storage identifiers. For example, the device associated with the first entity may, after receiving access to the commercial actor data, provide a request for the commercial actor data to the particular node. The request may include an entity identifier associated with the first entity. In this case, the particular node may search the node to verify that the entity identifier is on the list of entities that are permitted to access the commercial actor data and may obtain the set of storage identifiers needed to search the distributed file system for the commercial actor data.

Figure 1C:
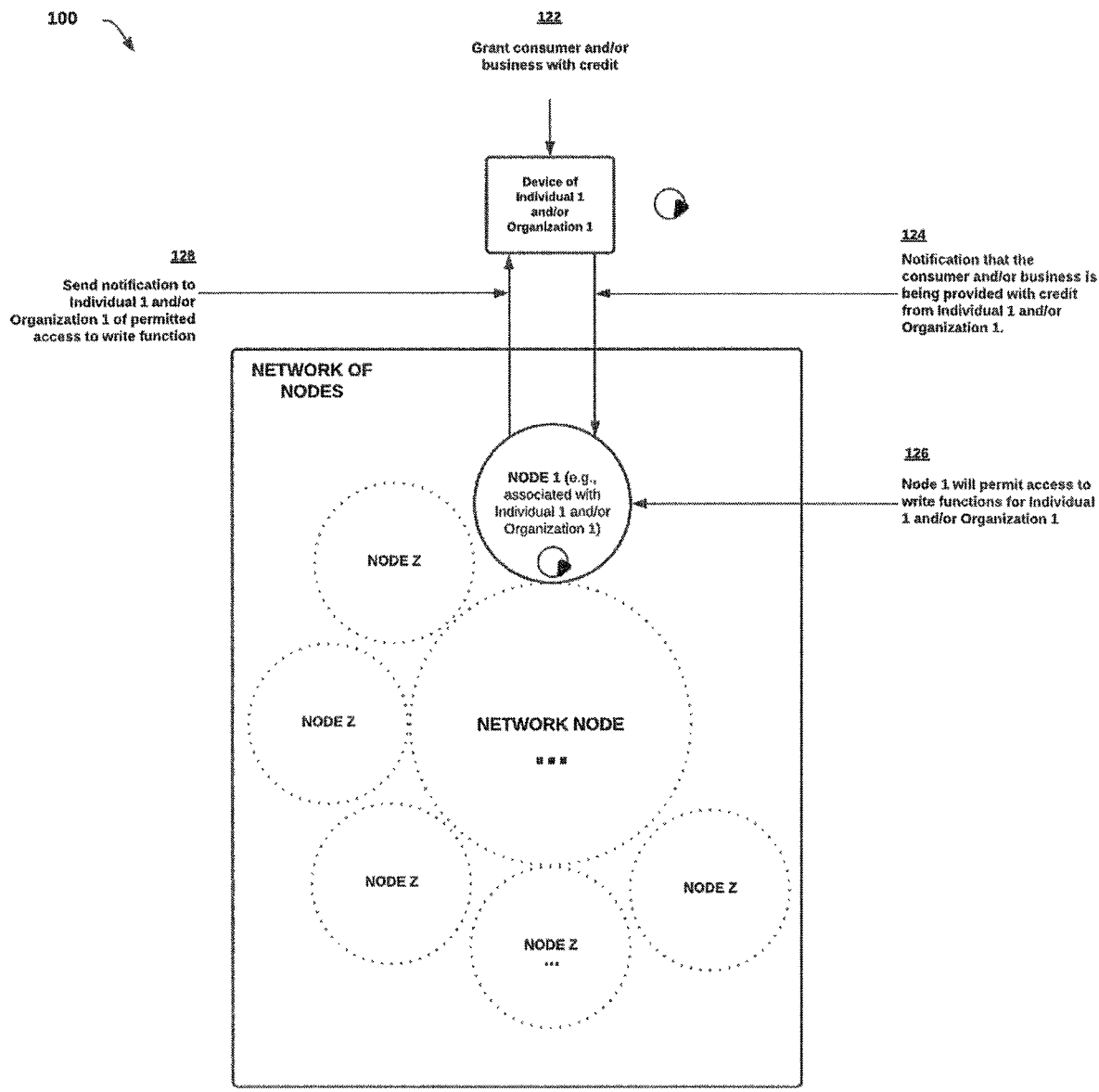

As shown in FIG. 1C, and by reference number 122, the device of the first entity may use the set of storage identifiers to search the distributed file system to obtain the encrypted commercial actor data. For example, the commercial actor data may be stored as encrypted data within the distributed file system (e.g., which had been encrypted using the public key of the first entity), and the device of the first entity may use the set of storage identifiers to search the distributed file system to obtain the encrypted commercial actor data. In this case, the distributed file system may use a data structure that associates the set of storage identifiers with the encrypted commercial actor data and with entity identifiers for entities that provided particular commercial actor data to the distributed file system.

In some implementations, rather than access the distributed file system directly, the device associated with the first entity is assigned the particular node, and the particular node may obtain the commercial actor data. For example, as described above, the device associated with the first entity may provide the request for the commercial actor data to the particular node, which may cause the particular node to obtain the set of storage identifiers. In this case, the particular node may use the set of storage identifiers to search the distributed file system for the commercial actor data, and may provide the commercial actor data to the device associated with the first entity.

As shown by reference number 124, the device of the first entity may use a private key associated with the first entity to decrypt the commercial actor data. For example, the first entity may have a private key, and, as described above, may have previously provided a corresponding public key to the first node (e.g., which the first node used to encrypt the commercial actor data). In this case, the device of the first entity may use the private key to decrypt the commercial actor data.

In this way, the device of the first entity is able to obtain the commercial actor data of the commercial actor, which may be processed to determine whether to grant the commercial actor with credit.

As shown by reference number 122, the device of the first entity may grant the commercial actor with credit. For example, the device associated with the entity may analyze the commercial actor data and may determine, based on the analysis, to grant the commercial actor with credit.

As shown by reference number 124, the device of the first entity may provide, to the first node (or to another device or account associated with the commercial actor), a notification indicating that the commercial actor is being granted with credit.

As shown by reference number 126, the first node may permit the first entity to access the write function of the node. For example, because the commercial actor has been granted with credit, the first entity may have new commercial actor data associated with the commercial actor that needs to be added to the node (e.g., records of timely payments, untimely payments, and/or the like). As such, the first entity may be permitted to access the write function of the node so that the first entity may add the new commercial actor data to the node.

As shown by reference number 128, the first node may provide the device of the first entity with a notification indicating that access to the write function has been permitted.

Figure 1D:
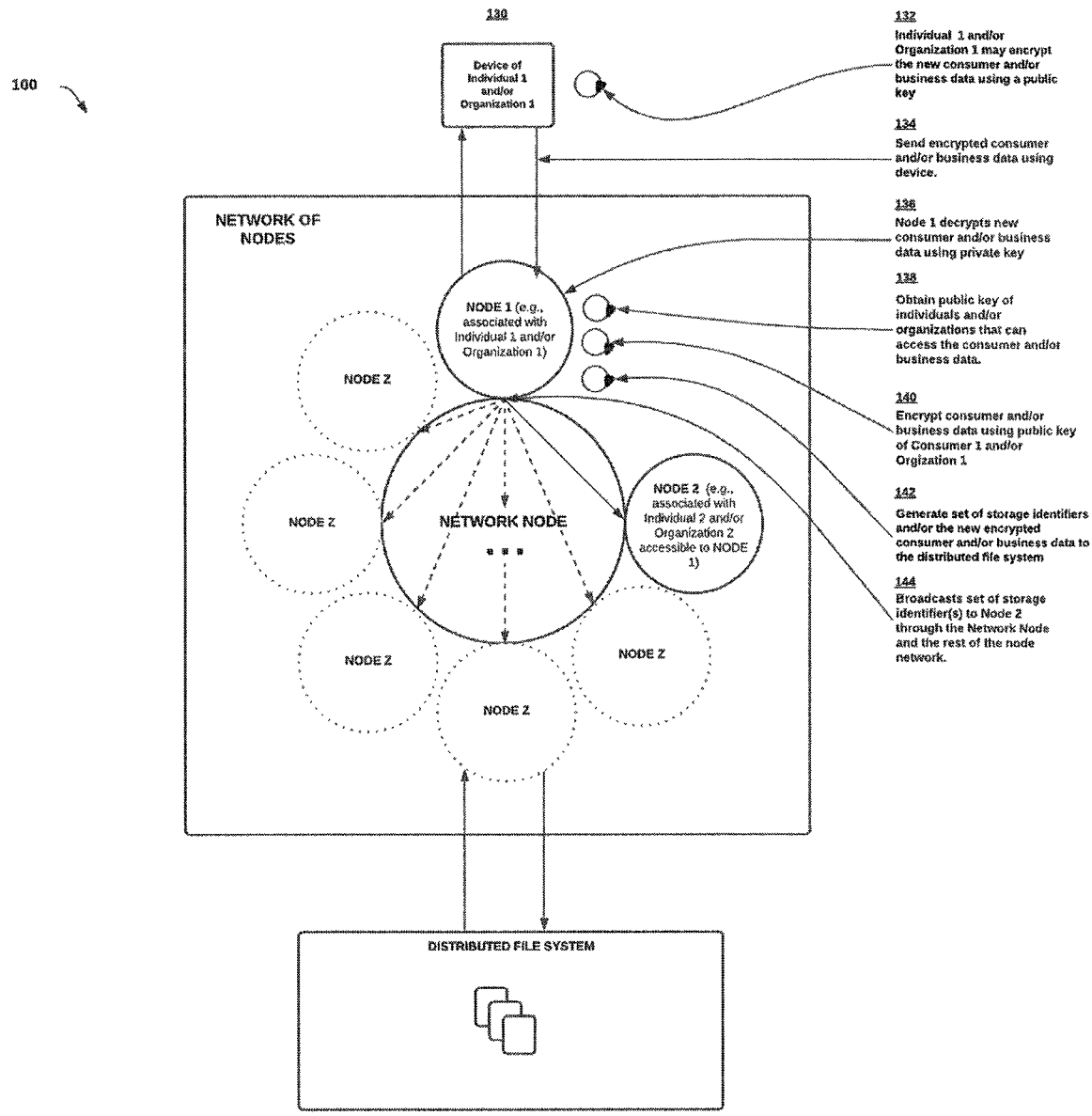
Figure 1E:
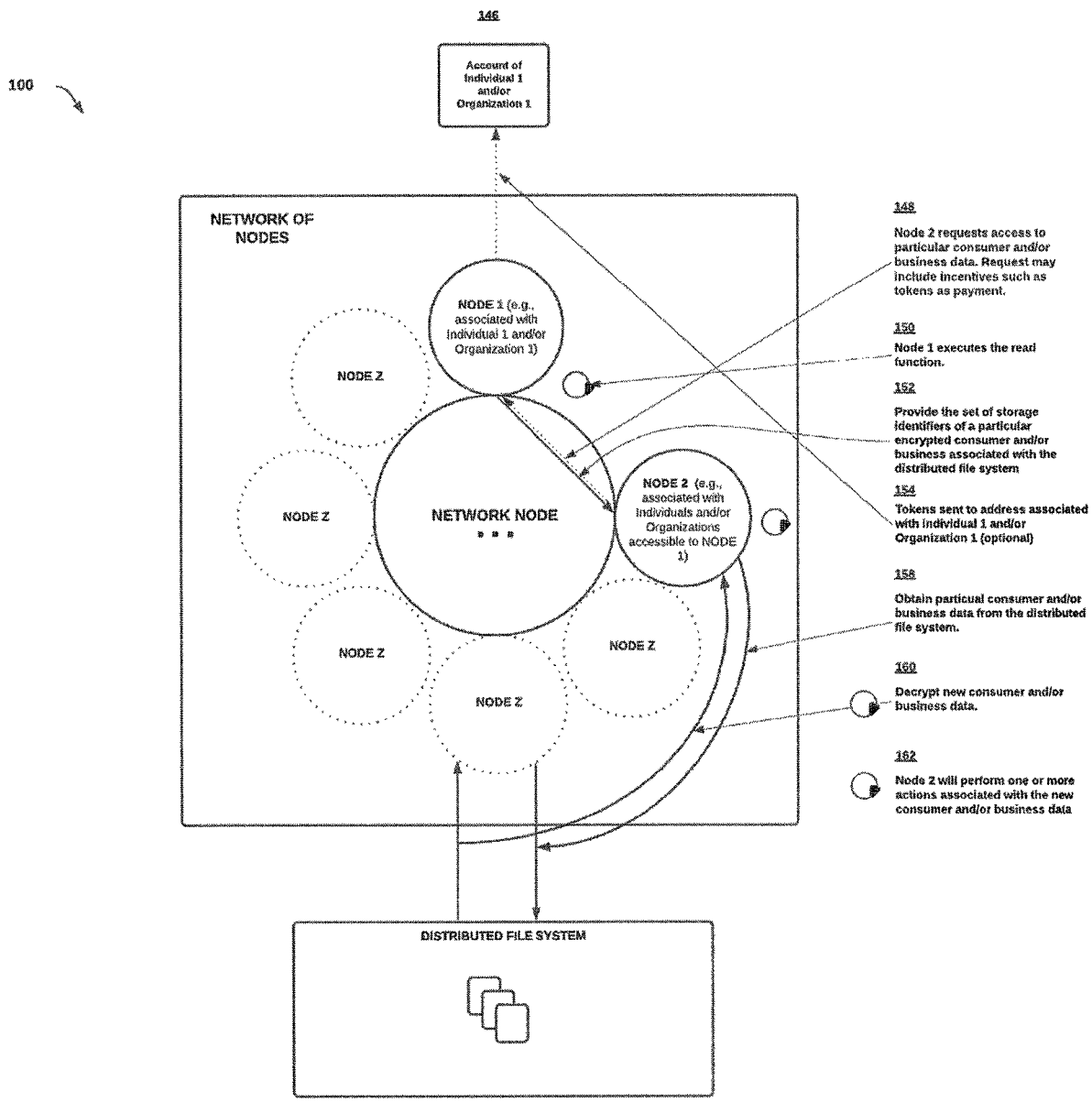

In this way, the device of the first entity is able to use the write function of the node to add new commercial actor data to the node, as described with regard to FIG. 1E.

As shown in FIG. 1D, and by reference number 130, the device of the first entity may receive new commercial actor data. For example, the device of the first entity may receive new commercial actor data indicating that the commercial actor opened a new account, made a timely payment, failed to make a timely payment, and/or the like.

As shown by reference number 132, the device of the first entity may encrypt the new commercial actor data using a public key. For example, the device of the first entity may encrypt the new commercial actor data using the public key associated with the commercial actor and/or public keys associated with entities which have been granted write access, which may have been provided to the device associated with the first entity when the first entity was permitted to access the read function and/or the write function of the node. In some implementations, the device associated with the first entity may encrypt the new commercial actor data using the public key associated with the first entity.

As shown by reference number 134, the device of the first entity may provide the encrypted new commercial actor data to the first node.

As shown by reference number 136, the first node may decrypt the new commercial actor data. For example, the first node may use a private key associated with the commercial actor or a private key associated with the first entity to decrypt the new commercial actor data.

As shown by reference number 138, the first node may obtain, from the node, a set of public keys associated with entities that are permitted to access the new commercial actor data. For example, the node may store a list of entity identifiers of entities that are permitted to access the new commercial actor data, and the list of entity identifiers may be stored in association with the set of public keys of the entities. This may allow the first node to search (e.g., query) the node to obtain the set of public keys.

As shown by reference number 140, the first node may encrypt the new commercial actor data and may generate a set of storage identifiers for the new commercial actor data. For example, the first node may encrypt a new commercial actor data using the set of public keys, such that each entities public key is used to create an encrypted new commercial actor data. In this case, the first node may execute a mapping function, such as a hash function (e.g., as described elsewhere herein), to generate a set of storage identifiers for the new commercial actor data.

As shown by reference number 142, the first node may provide the set of storage identifiers to a node of the entities (e.g., NODE 2 is accessible to the first node). For example, the node may store the set of storage identifiers for the encrypted new commercial actor data in a manner that associates the set of storage identifiers with one or more identifiers associated with the entities (e.g., entity identifiers, public keys of the entities, etc.).

As shown by reference number 144, the first node may provide the set of storage identifiers and the new encrypted commercial actor data to the distributed file system. In this way, the encrypted new commercial actor data may be stored in association with the set of storage identifier, thereby allowing entities to use nodes to execute the read function of the node to identify memory locations of particular encrypted new commercial actor data. This may allow entities to instruct nodes to reference the memory location to obtain the particular encrypted new commercial actor data, as described further herein.

As shown in FIG. 1E, and by reference number 146, the first node may broadcast the set of storage identifiers to the network of nodes (or to one or more nodes in the network of nodes). For example, the first node may search the node to obtain entity identifiers and entity addresses of nodes associated with particular entities that are permitted to access the new commercial actor data. In some cases, the first node may have already obtained the entity identifiers and entity addresses (e.g., when the first node searched the node for the key of public keys). Next, the first node may broadcast the set of storage identifiers to the addresses of nodes associated with the particular entities that are permitted to access the new commercial actor data.

In some implementations, nodes that receive the set of storage identifiers may update the node. For example, the nodes may update the node to include the set of storage identifiers, such that entities associated with those nodes are able to obtain the set of storage identifiers for obtaining (e.g., reading) particular new commercial actor data that may have been provided to the node.

As shown by reference number 148, a second node that is associated with a second entity may interact with the node (e.g., network node) to request to obtain (e.g., read) the new commercial actor data. The request may include an entity identifier associated with the second entity and incentives offered in exchange for commercial actor data.

Furthermore, the tokens (e.g., digital currency, such as cryptocurrency) that may serve as payment for accessing the new commercial actor data, and/or the like. In this case, the network of nodes may adhere to an agreement indicating that a certain amount of tokens may be provided to read commercial actor data (and/or new commercial actor data).

The tokens may be provided to an entity writing the commercial actor data, which may create incentives for entities to continue to add new commercial actor data to the node of the commercial actor. For example, for the first entity to obtain new commercial actor data provided by other entities, the first entity may need to first earn tokens by providing new commercial actor data to the node. This ensures that the node remains updated with current commercial actor data of the commercial actor.

As shown by reference number 150, the node may execute the read function. For example, the node may verify that the second entity is permitted to access the new commercial actor data and/or may verify that the second entity has provided a requisite amount of tokens. If the verifications succeed, the node may execute the read function, which, as shown by reference number 156, may cause a storage identifier for a particular encrypted new commercial actor data to be provided to the second node.

As shown by reference number 152, the node may provide the tokens to an account associated with the first entity. In this case, the first entity may be the recipient of the tokens because the first entity provided the new commercial actor data.

As shown by reference number 154, in some cases, the request to read the new commercial actor data may include an offer of tokens (but not the actual tokens). In this case, the node may, after receiving the offer, interact with an account associated with the second entity and the account associated with the first entity to orchestrate the transfer of tokens from the account associated with the second entity to the account associated with the first entity.

As shown by reference number 158, the second node may obtain, from the distributed file system, the particular copy of the encrypted new commercial actor data. For example, the second node may use the storage identifier to identify the memory location of a copy of the encrypted new commercial actor data that is associated with the second entity, and may search the memory location to obtain the copy of the encrypted new commercial actor data.

As shown by reference number 160, the second node may decrypt the new commercial actor data (e.g., using the private key associated with the second entity).

As shown by reference number 162, the second node may perform one or more actions associated with the new commercial actor data. For example, the second node may provide the new commercial actor data for display on an interface that is accessible to the second entity and/or may provide the new commercial actor data to a device associated with the second entity. This may allow employees or devices of the second entity to process the copy of the new commercial actor data (e.g., to decide whether to offer the commercial actor additional credit, a new credit-related service, and/or the like).

In some implementations, the network of nodes may continue to exchange new commercial actor data and tokens as the commercial actor builds a credit history. In this way, the incentivize provided by the exchange of the new credit and the tokens ensures that the node continues to be provided with up to date credit information of the commercial actor.

In some implementations, one or more machine learning models are utilized to improve performance with systems, processes, and/or functions described herein. For example, a node may train a machine learning model on historical commercial actor data (or may receive a trained machine learning model), such that the node is able to use the machine learning model to determine a credit score for the commercial actor, determine an amount of credit to grant the commercial actor, determine a type of credit to offer the commercial actor, and/or the like. Additionally, or alternatively, the node may train a machine learning model on historical network data, such that the machine learning model is able to make optimization decisions relating to storage of commercial actor data. In this case, the machine learning model may be associated with the mapping function, such that the machine learning model may be used with the mapping function to output storage identifiers of memory locations that maximize storage efficiency within the distributed file system.

In this way, the network of nodes is able to securely exchange commercial actor data of the commercial actor. Additionally, by incentivizing entities to continue to add new commercial actor data, the node of the commercial actor will remain updated, thereby serving as a reliable indicator of credit worthiness of the commercial actor. Furthermore, the network of nodes conserves processing resources and/or network resources and/or memory resources. For example, a node conserves processing resources and/or network resources that might otherwise be used to query a set of credit bureau data sources to obtain commercial actor data of the commercial actor. As another example, by utilizing a distributed file system to store the commercial actor data, the node improves in scalability, and conserves memory resources that might otherwise be used to attempt to store the commercial actor data on the node.

As indicated above, FIGS. 1A-1E are provided merely as examples. Other examples are possible and may differ from what was described with regard to FIGS. 1A-1E. For example, in some implementations, the network of nodes is implemented with a management node (e.g., a ledger management platform). In this case, one or more techniques and/or features that are described as being performed by the set of nodes may be performed by the management node.

Figure 2:
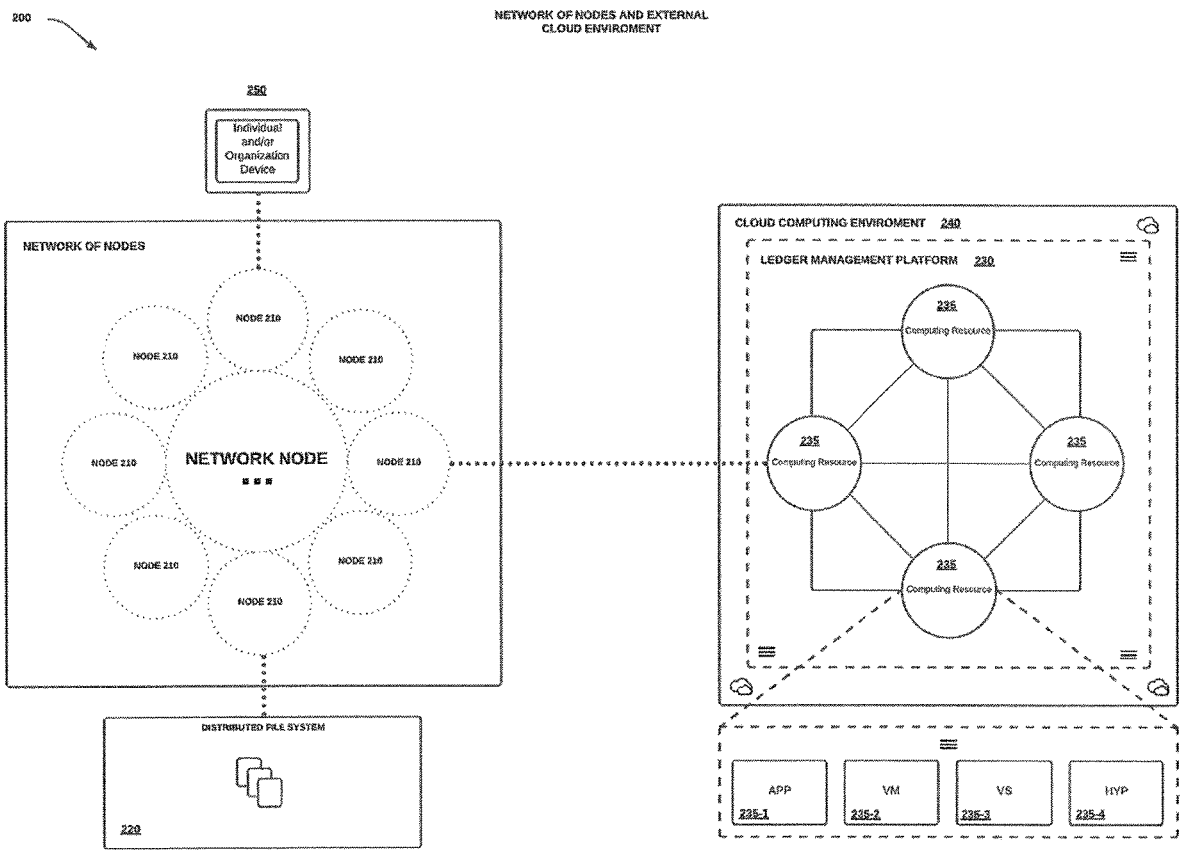
FIG. 2 is a diagram of an example environment in which systems and/or methods, described herein, may be implemented.

FIG. 2 is a diagram of an example environment, in which environment 200 systems and/or methods described herein may be implemented. As shown in FIG. 2, environment 200 may include a node 210, a distributed data source 220, a ledger management platform 230 hosted within a cloud computing environment 240, a user device 250, and/or a network 260. Devices of environment 200 may interconnect via wired connections, wireless connections, or a combination of wired and wireless connections.

Node 210 includes one or more devices capable of receiving, generating, storing, processing, and/or providing information associated with credit of a commercial actor. For example, node 210 may include a computing device (e.g., a desktop computer, a laptop computer, a tablet computer, a handheld computer, a server device, etc.), a mobile phone (e.g., a smart phone, a radiotelephone, etc.), or a similar device.

In some implementations, a set of nodes 210 are part of a network that is able to utilize a node and/or a distributed file system to securely share commercial actor data of a commercial actor. In some implementations, node 210 is associated with a commercial actor that has a credit history. Additionally, or alternatively, node 210 may be associated with an entity such as a financial institution. In some implementations, node 210 may store a node associated with a commercial actor. In this case, the node may include a storage identifier (e.g., a hashed value) that serves as a pointer to a memory location within a distributed file system supported by distributed data source 220.

Distributed data source 220 includes one or more devices capable of receiving, generating, storing, processing, and/or providing information associated with credit of a commercial actor. For example, distributed data source 220 may include a computing device, such as a server, a desktop computer, a laptop computer, a tablet computer, a handheld computer, or a similar device. In some implementations, distributed data source 220 may support a distributed file system that is used to store the commercial actor data of the commercial actor. In some implementations, distributed data source 220 may store encrypted commercial actor data for the commercial actor, and may associate the encrypted commercial actor data with one or more storage identifiers and/or entity identifiers.

Ledger management platform 230 includes one or more devices capable of receiving, generating, storing, processing, and/or providing information associated with credit of a commercial actor. For example, ledger management platform 230 may include a server or a group of servers. In some implementations, ledger management platform 230 performs one or more actions described as being performed by node 210.

In some implementations, as shown, ledger management platform 230 is hosted in cloud computing environment 240. Notably, while implementations described herein describe ledger management platform 230 as being hosted in cloud computing environment 240, in some implementations, ledger management platform 230 is not be cloudbased (i.e., is implemented outside of a cloud computing environment) or is partially cloudbased.

Cloud computing environment 240 includes an environment that hosts the ledger management platform 230. Cloud computing environment 240 may provide computation, software, data access, storage, etc. services that do not require end-user knowledge of a physical location and configuration of system(s) and/or device(s) that hosts the ledger management platform 230. As shown, cloud computing environment 240 may include a group of computing resources 235 (referred to collectively as "computing resources 235" and individually as "computing resource 235").

Computing resource 235 includes one or more personal computers, workstation computers, server devices, or another type of computation and/or communication device. In some implementations, computing resource 235 hosts the ledger management platform 230. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more, applications (APP) 235-1, virtual machines (VM) 235-2, virtualized storage (VS) 235-3, hypervisors (HYP) 235-4, and/or the like.

Application 235-1 may include one or more software applications that may be provided to or accessed by node 210 and/or distributed data source 220. Application 235-1 may eliminate a need to install and execute the software applications on these devices. For example, application 235-1 may include software associated with ledger management platform 230 and/or any other software capable of being provided via cloud computing environment 240. In some implementations, one application 235-1 may send/receive information to/from one or more applications 235-1, via virtual machine 235-2.

Virtual machine 235-2 may include a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system (OS). A process virtual machine may execute a single program, and may support a single process. In some implementations, virtual machine 235-2 may execute on behalf of another device (e.g., node 210 and/or distributed data source 220), and may manage infrastructure of cloud computing environment 240, such as data management, synchronization, or longduration data transfers.

Virtualized storage 235-3 may include one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 may provide hardware virtualization techniques that allow multiple operating systems (e.g., "guest operating systems") to execute concurrently on a host computer, such as computing resource 235. Hypervisor 235-4 may present a virtual operating platform to the guest operating systems, and may manage the execution of the guest operating systems. Multiple instances of a variety of operating systems may share virtualized hardware resources.

User device 250 includes one or more devices capable of receiving, generating, storing, processing, and/or providing information associated with credit of a commercial actor. For example, user device 250 may include a computing device (e.g., a desktop computer, a laptop computer, a tablet computer, a handheld computer, a server device, etc.), a mobile phone (e.g., a smart phone, a radiotelephone, etc.), or a similar device. In some implementations, user device 250 is associated with an entity, such as a financial institution, that is not part of the set of nodes 210, but that is requesting access to commercial actor data associated with a commercial actor.

Network 260 includes one or more wired and/or wireless networks. For example, network 260 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Figure 3:
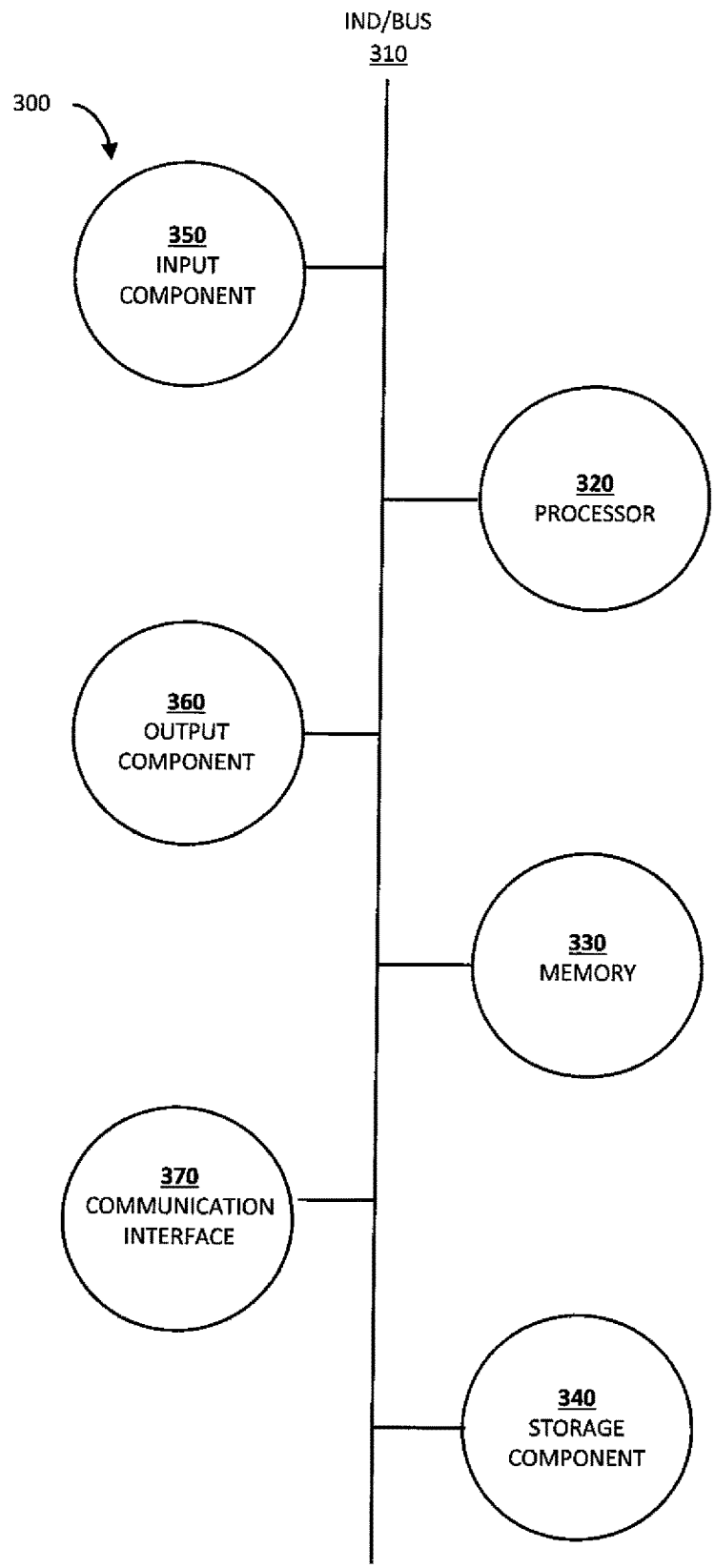
FIG. 3 is a diagram of example components of one or more devices of FIG. 2.

FIG. 3 is a diagram of example components of a device 300. Device 300 may correspond to node 210, distributed data source 220, ledger management platform 230, computing resource 235, and/or user device 250. In some implementations, node 210, distributed data source 220, ledger management platform 230, computing resource 235, and/or user device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 includes a component that provides output information from device 300 (e.g., a display, a speaker, one or more light-emitting diodes (LEDs), etc.).

Communication interface 370 includes a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

In preferred embodiments, device 300 performs one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
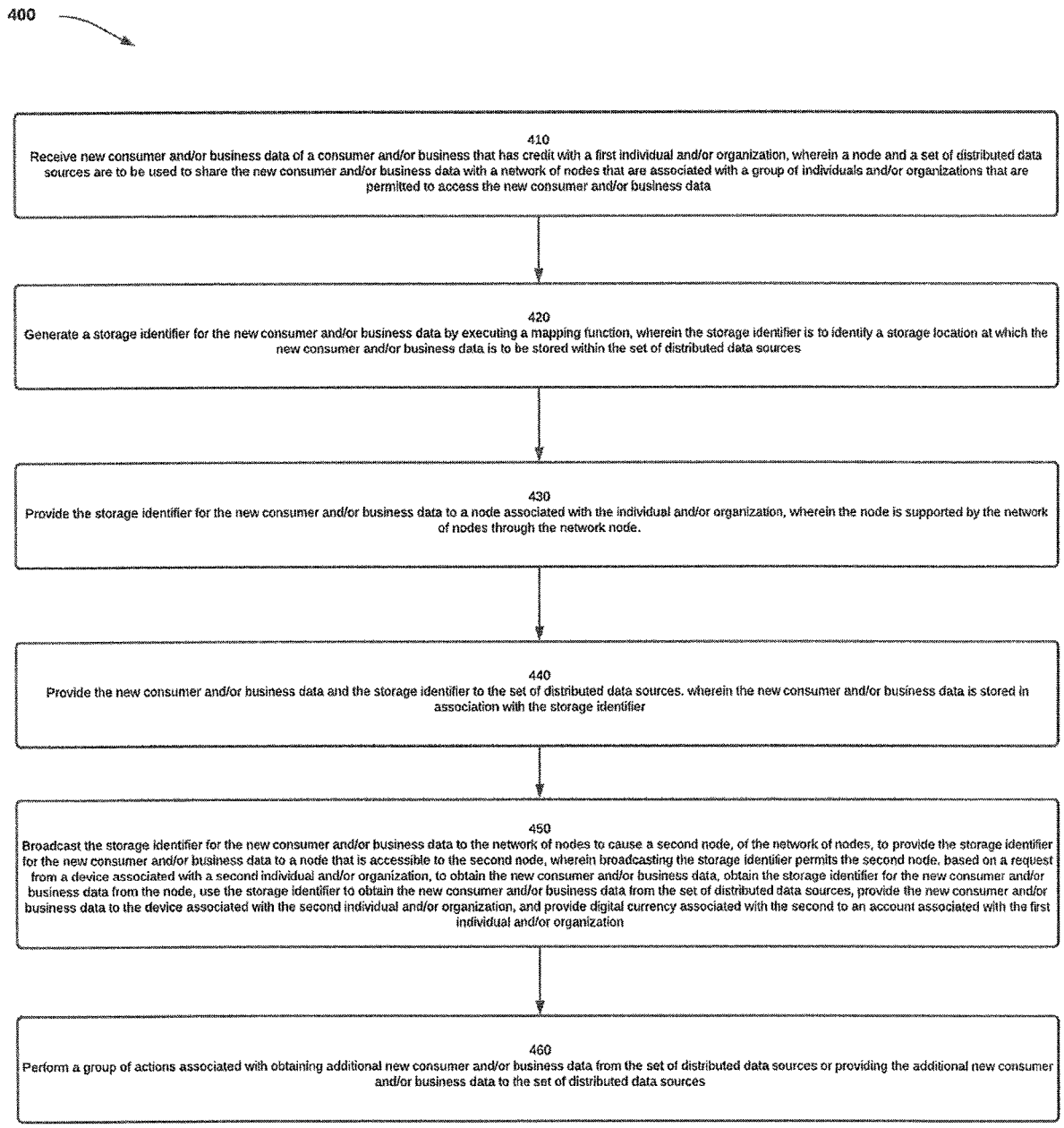

FIG. 4 is a flow chart of an example process 400 for sharing commercial actor data of a commercial actor among a network of nodes that have access to a node, a node associated with the commercial actor, and a distributed file system. In some implementations, one or more process blocks of FIG. 4 are performed by a device, such as a first node (e.g., node 210). In some implementations, one or more process blocks of FIG. 4 are performed by another device or a group of devices separate from or including the first node, such as another node, a distributed data source (e.g., distributed data source 220), a ledger management platform (e.g., ledger management platform 230), and/or a user device (e.g., user device 250).

As shown in FIG. 4, process 400 may include receiving new commercial actor data of a commercial actor that has credit with a first entity, wherein a node and a set of distributed data sources are to be used to share the new commercial actor data with a network of nodes that are associated with a group of entities that are permitted to access the new commercial actor data (block 410). For example, the first node (e.g., using processor 320, input component 350, communication interface 370, etc.) may receive new commercial actor data of a commercial actor that has credit with a first entity, as described above with regard to FIGS. 1A-1E. In some implementations, a node and a set of distributed data sources are used to share the new commercial actor data with a network of nodes that are associated with a group of entities that are permitted to access the new commercial actor data.

As further shown in FIG. 4, process 400 may include generating a storage identifier for the new commercial actor data by executing a mapping function, wherein the storage identifier is to identify a storage location at which the new commercial actor data is to be stored within the set of distributed data sources (block 420). For example, the first node (e.g., using processor 320, storage component 340, etc.) may generate a storage identifier for the new commercial actor data by executing a mapping function, as described above with regard to FIGS. 1A-1E. In some implementations, the storage identifier may identify a storage location at which the new commercial actor data is to be stored within the set of distributed data sources.

As further shown in FIG. 4, process 400 may include providing the storage identifier for the new commercial actor data to a node associated with the commercial actor, wherein the node is supported by the node (block 430). For example, the first node (e.g., using processor 320, output component 360, communication interface 370, etc.) may provide the storage identifier for the new commercial actor data to a node associated with the commercial actor, as described above with regard to FIGS. 1A-1E. In some implementations, the node may be supported by the node.

As further shown in FIG. 4, process 400 may include providing the new commercial actor data and the storage identifier to the set of distributed data sources, wherein the new commercial actor data is stored in association with the storage identifier (block 440). For example, the first node (e.g., using processor 320, output component 360, communication interface 370, etc.) may provide the new commercial actor data and the storage identifier to the set of distributed data sources, as described above with regard to FIGS. 1A-1E. In some implementations, the new commercial actor data is stored in association with the storage identifier.

As further shown in FIG. 4, process 400 may include broadcasting the storage identifier for the new commercial actor data to the network of nodes to cause a second node, of the network of nodes, to provide the storage identifier for the new commercial actor data to a node that is accessible to the second node, wherein broadcasting the storage identifier permits the second node, based on a request from a device associated with a second entity, to obtain the new commercial actor data, obtain the storage identifier for the new commercial actor data from the node, use the storage identifier to obtain the new commercial actor data from the set of distributed data sources, provide the new commercial actor data to the device associated with the second entity, and provide digital currency associated with the second entity to an account associated with the first entity (block 450). For example, the first node (e.g., using processor 320, output component 360, communication interface 370, etc.) may broadcast the storage identifier for the new commercial actor data to the network of nodes to cause a second node, of the network of nodes, to provide the storage identifier for the new commercial actor data to a node that is accessible to the second node, as described above with regard to FIGS. 1A-1E.

In some implementations, the first node broadcasting the storage identifier may permit the second node, based on a request from a device associated with a second entity (e.g., the user device), to obtain the new commercial actor data, obtain the storage identifier for the new commercial actor data from the node, use the storage identifier to obtain the new commercial actor data from the set of distributed data sources, provide the new commercial actor data to the device associated with the second entity, and provide digital currency associated with the second entity to an account associated with the first entity.

As further shown in FIG. 4, process 400 may include performing a group of actions associated with obtaining additional new commercial actor data from the set of distributed data sources or providing the additional new commercial actor data to the set of distributed data sources (block 460). For example, the first node (e.g., using processor 320, memory 330, storage component 340, input component 350, output component 360, communication interface 370, etc.) may perform a group of actions associated with obtaining additional new commercial actor data from the set of distributed data sources or providing the additional new commercial actor data to the set of distributed data sources, as described above with regard to FIGS. 1A-1E.

Process 400 may include additional implementations, such as any single implementation or any combination of implementations described below and/or in connection with one or more other processes described elsewhere herein.

In some implementations, the node is used exclusively for the commercial actor. In some implementations, the node may include data identifying the group of entities that are permitted to access the new commercial actor data, a set of storage identifiers identifying a set of storage locations associated with historical commercial actor data of the commercial actor, a first function associated with adding the new commercial actor data to the set of distributed data sources, a second function associated with obtaining the new commercial actor data from the set of distributed data sources, a third function associated with providing incentives to the group of entities to use the network of nodes to interact with the node to execute the first function and the second function.

In some implementations, while generating the storage identifier, the first node may generate, using a content addressing technique, a cryptographic hash value identifying the storage location at which the new commercial actor data is to be stored within the set of distributed data sources. Additionally, the cryptographic hash value may be used as the storage identifier for the new commercial actor data.

In some implementations, the device associated with the first entity is permitted to access the new commercial actor data if an entity identifier for the first entity is stored by a data structure associated with the node. Additionally, the entity identifier for the first entity may be stored by the data structure after a particular amount of the digital currency associated with the first entity is provided to an account associated with the commercial actor.

In some implementations, while performing the group of actions, the first node may obtain the additional new commercial actor data from the set of distributed data sources. In this case, another node in the network of nodes may have provided the additional new commercial actor data to the set of distributed data sources. Additionally, the other node may be associated with a particular entity. Additionally, obtaining the additional new commercial actor data may cause the digital currency to be provided to an account associated with the particular entity.

In some implementations, while performing the group of actions, the first node may provide the additional new commercial actor data to the set of distributed data sources to cause nodes associated with other entities to obtain the additional new commercial actor data in exchange for a particular amount of the digital currency. In some implementations, while performing the group of actions, the first node may automatically obtain the additional new commercial actor data from the set of distributed data sources based on determining that the account associated with the first entity has a particular amount of the digital currency.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a call flow diagram of an example call flow 500 for sharing commercial actor data of a commercial actor among a network of nodes that have access to a node, a node associated with the commercial actor, and a distributed file system. In some implementations, one or more process blocks of FIG. 5 is performed by a device, such as a first node (e.g., node 210). In some implementations, one or more process blocks of FIG. 5 is performed by another device or a group of devices separate from or including the first node, such as another node, a distributed data source (e.g., distributed data source 220), a ledger management platform (e.g., ledger management platform 230), and/or a user device (e.g., user device 250).

As shown in FIG. 5, process 500 may include receiving, by a first node associated with a first entity, a storage identifier for new commercial actor data associated with a commercial actor, wherein a node and a set of distributed data sources are used to share the new commercial actor data with a network of nodes that are associated with a group of entities that are permitted to access the new commercial actor data, wherein the storage identifier is used to identify a storage location at which the new commercial actor data is to be stored within the set of distributed data sources, wherein the new commercial actor data has been provided to the set of distributed data sources by a second node associated with a second entity of the group of entities (block 510). For example, the first node may receive (e.g., using processor 320, input component 350, communication interface 370, etc.), by a first node that is associated with a first entity, a storage identifier for new commercial actor data associated with a commercial actor, as described above with regard to FIGS. 1A-1E.

In some implementations, a node and a set of distributed data sources is used to share the new commercial actor data with a network of nodes that are associated with a group of entities that are permitted to access the new commercial actor data. In some implementations, the storage identifier is used to identify a storage location at which the new commercial actor data is to be stored within the set of distributed data sources. In some implementations, the new commercial actor data may have been provided to the set of distributed data sources by a second node associated with a second entity of the group of entities.

As shown in FIG. 5, process 500 may include updating a node associated with the commercial actor to include the storage identifier for the new commercial actor data (block 520). For example, the first node (e.g., using processor 320, output component 360, communication interface 370, etc.) may update a node associated with the commercial actor to include the storage identifier for the new commercial actor data, as described above with regard to FIGS. 1A-1E.

As shown in FIG. 5, process 500 may include receiving, from a device associated with the first entity, a request for the new commercial actor data (block 530). For example, the first node (e.g., using processor 320, input component 350, communication interface 370, etc.) may receive, from a device associated with the first entity (e.g., the user device), a request for the new commercial actor data, as described above with regard to FIGS. 1A-1E.

As shown in FIG. 5, process 500 may include obtaining, by the first node, the storage identifier for the new commercial actor data from the node (block 540). For example, the first node (e.g., using processor 320, input component 350, output component 360, communication interface 370, etc.) may obtain the storage identifier for the new commercial actor data from the node, as described above with regard to FIGS. 1A-1E. In some implementations, the first node obtaining the storage identifier from the node may cause the node to provide digital currency associated with the first entity to an account associated with the second entity.

As shown in FIG. 5, process 500 may include obtaining the new commercial actor data by using the storage identifier to search the set of distributed data sources (block 550). For example, the first node (e.g., using processor 320, input component 350, output component 360, communication interface 370, etc.) may obtain the new commercial actor data by using the storage identifier to search the set of distributed data sources, as described above with regard to FIGS. 1A-1E.

As shown in FIG. 5, process 500 may include providing the new commercial actor data to the device associated with the first entity (block 560). For example, the first node (e.g., using processor 320, output component 360, communication interface 370, etc.) may provide the new commercial actor data to the device associated with the first entity, as described above with regard to FIGS. 1A-1E.

As shown in FIG. 5, process 500 may include performing a group of actions associated with obtaining additional new commercial actor data from the set of distributed data sources or providing the additional new commercial actor data to the set of distributed data sources (block 570). For example, the first node (e.g., using processor 320, memory 330, storage component 340, input component 350, output component 360, communication interface 370, etc.) may perform a group of actions associated with obtaining additional new commercial actor data from the set of distributed data sources or providing the additional new commercial actor data to the set of distributed data sources, as described above with regard to FIGS. 1A1E.

Process 500 may include additional implementations, such as any single implementation or any combination of implementations described below and/or in connection with one or more other processes described elsewhere herein.

In some implementations, the device associated with the first entity is permitted to access the new commercial actor data if an entity identifier for the first entity is stored by a data structure associated with the node. Additionally, the entity identifier for the first entity may be stored by the data structure after a particular amount of the digital currency associated with the first entity is provided to an account associated with the commercial actor.

In some implementations, the node is exclusive to the commercial actor. Additionally, the node may include data identifying the group of entities that are permitted to access the new commercial actor data, a set of storage identifiers identifying a set of storage locations associated with historical commercial actor data of the commercial actor, a first function associated with providing the new commercial actor data to the set of distributed data sources, and/or a second function associated with obtaining the new commercial actor data from the set of distributed data sources, wherein the second function requires that a particular amount of the digital currency be provided to obtain the new commercial actor data.

In some implementations, the new commercial actor data obtained from the set of distributed data sources may have been encrypted using a first key associated with the commercial actor. Additionally, the first node may decrypt the new commercial actor data using a second key associated with the commercial actor. Additionally, the first node may encrypt the new commercial actor data using a first key associated with the first entity. Additionally, while providing the new commercial actor data to the device associated with the first entity, the first node may provide the new commercial actor data that has been encrypted using the first key associated with the first entity to permit the device associated with the first entity to decrypt the new commercial actor data using a second key associated with the first entity.

In some implementations, the node may provide the digital currency to the account associated with the second entity by executing one or more functions associated with creating incentives for the group of entities to use the network of nodes to continue to add the additional new commercial actor data to the set of distributed data sources.

In some implementations, while performing the group of actions, the first node may obtain the additional new commercial actor data from the set of distributed data sources to cause a particular amount of the digital currency to be provided to an account associated with a third entity that has used a third node to provide the additional new commercial actor data to the set of distributed data sources. In some implementations, while performing the group of actions, the first node may provide the additional new commercial actor data to the set of distributed data sources. Additionally, providing the additional new commercial actor data to the set of distributed data sources may permit other entities to use the network of nodes to obtain the additional new commercial actor data in exchange for a particular amount of the digital currency.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
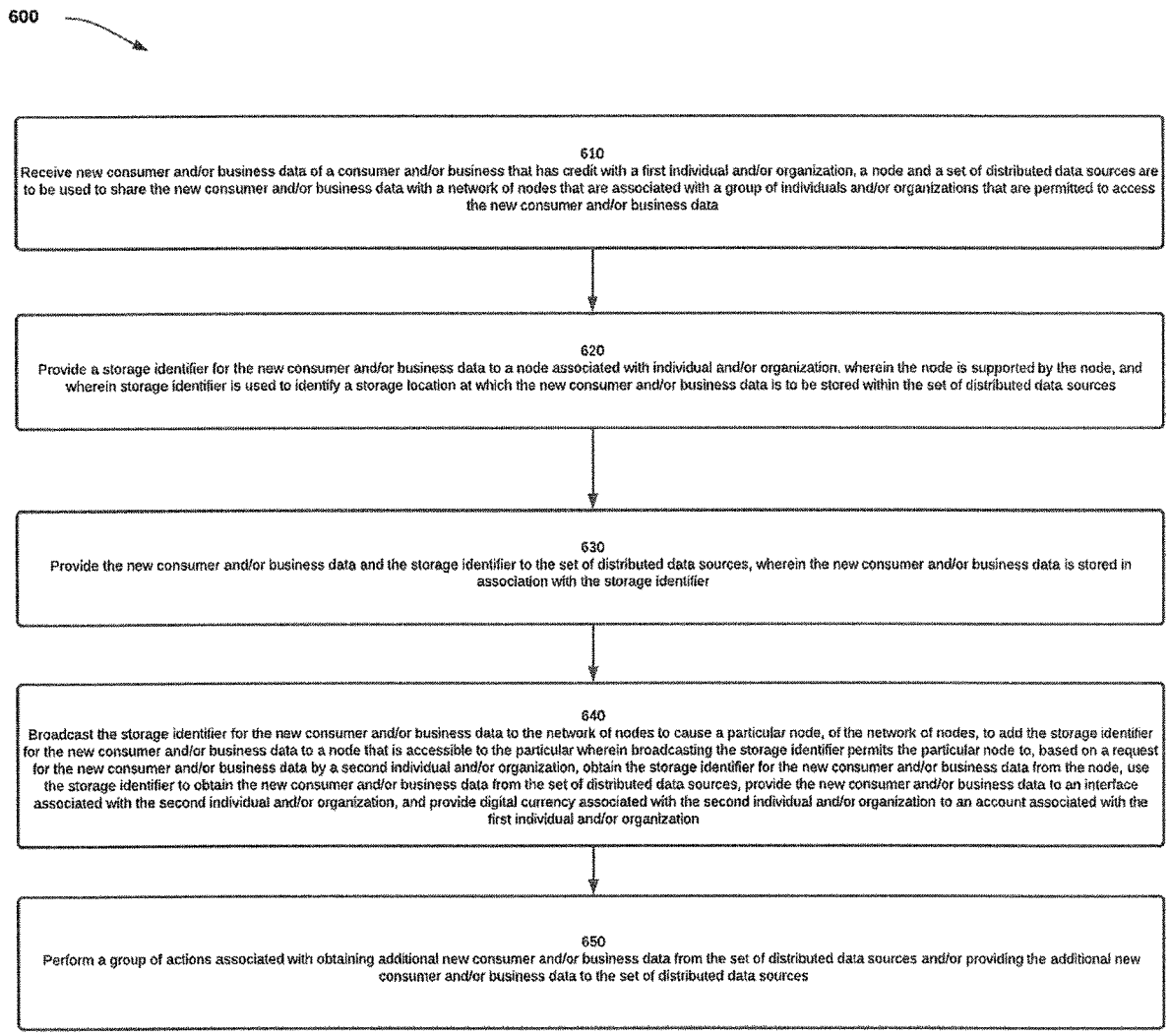

FIG. 6 is a call flow diagram of an example call flow 600 for sharing commercial actor data of a commercial actor among a network of nodes that have access to a node, a node associated with the commercial actor, and a distributed file system. In some implementations, one or more process blocks of FIG. 6 is performed by a device, such as a first node (e.g., node 210). In some implementations, one or more process blocks of FIG. 6 is performed by another device or a group of devices separate from or including the first node, such as another node, a distributed data source (e.g., distributed data source 220), a ledger management platform (e.g., ledger management platform 230), and/or a user device (e.g., user device 250).

As shown in FIG. 6, process 600 may include receiving new commercial actor data of a commercial actor that has credit with a first entity, wherein a node and a set of distributed data sources are to be used to share the new commercial actor data with a network of nodes that are associated with a group of entities that are permitted to access the new commercial actor data (block 610). For example, the first node (e.g., using processor 320, input component 350, communication interface 370, etc.) may receive new commercial actor data of a commercial actor that has credit with a first entity, as described above with regard to FIGS. 1A-1E. In some implementations, a node and a set of distributed data sources is used to share the new commercial actor data with a network of nodes that are associated with a group of entities that are permitted to access the new commercial actor data.

As shown in FIG. 6, process 600 may include providing a storage identifier for the new commercial actor data to a node associated with the commercial actor, wherein the node is supported by the node, and wherein the storage identifier is used to identify a storage location at which the new commercial actor data is to be stored within the set of distributed data sources (block 620). For example, the first node (e.g., using processor 320, output component 360, communication interface 370, etc.) may provide a storage identifier for the new commercial actor data to a node associated with the commercial actor, as described above with regard to FIGS. 1A-1E. In some implementations, the node is supported by the node. In some implementations, the storage identifier is used to identify a storage location at which the new commercial actor data is to be stored within the set of distributed data sources.

As shown in FIG. 6, process 600 may include providing the new commercial actor data and the storage identifier to the set of distributed data sources (block 630). For example, the first node (e.g., using processor 320, output component 360, communication interface 370, etc.) may provide the new commercial actor data and the storage identifier to the set of distributed data sources, as described above with regard to FIGS. 1A-1E. In some implementations, the new commercial actor data is stored in association with the storage identifier.

As shown in FIG. 6, process 600 may include broadcasting the storage identifier for the new commercial actor data to the network of nodes to cause a particular node, of the network of nodes, to add the storage identifier for the new commercial actor data to a node that is accessible to the particular node, wherein broadcasting the storage identifier permits the particular node to, based on a request for the new commercial actor data by a second entity, obtain the storage identifier for the new commercial actor data from the node, use the storage identifier to obtain the new commercial actor data from the set of distributed data sources, provide the new commercial actor data to an interface associated with the second entity, and provide digital currency associated with the second entity to an account associated with the first entity (block 640). For example, the first node (e.g., using processor 320, output component 360, communication interface 370, etc.) may broadcast the storage identifier for the new commercial actor data to the network of nodes to cause a particular node, of the network of nodes, to add the storage identifier for the new commercial actor data to a node that is accessible to the particular node, as described above with regard to FIGS. 1A-1E.

In some implementations, broadcasting the storage identifier may permit the particular node to, based on a request for the new commercial actor data by a second entity, obtain the storage identifier for the new commercial actor data from the node, use the storage identifier to obtain the new commercial actor data from the set of distributed data sources, provide the new commercial actor data to an interface associated with the second entity, and provide digital currency associated with the second entity to an account associated with the first entity.

As shown in FIG. 6, process 600 may include performing a group of actions associated with obtaining additional new commercial actor data from the set of distributed data sources and/or providing the additional new commercial actor data to the set of distributed data sources (block 650). For example, the first node (e.g., using processor 320, memory 330, storage component 340, input component 350, output component 360, communication interface 370, etc.) may perform a group of actions associated with obtaining additional new commercial actor data from the set of distributed data sources and/or providing the additional new commercial actor data to the set of distributed data sources, as described above with regard to FIGS. 1A-1E.

Process 600 may include additional implementations, such as any single implementation or any combination of implementations described below and/or in connection with one or more other processes described elsewhere herein.

In some implementations, the first entity is permitted to use the network of nodes to access the new commercial actor data if an entity identifier for the first entity is stored by a data structure associated with the node. Additionally, the entity identifier for the first entity may be added to the data structure after a particular amount of the digital currency associated with the first entity is provided to an account associated with the commercial actor.

In some implementations, the first node may generate, after receiving the new commercial actor data, the storage identifier for the new commercial actor data by using a content addressing technique to generate a cryptographic hash value identifying the storage location at which the new commercial actor data is to be stored within the set of distributed data sources. Additionally, the cryptographic hash value may be used as the storage identifier for the new commercial actor data. In some implementations, the node is used exclusively for the commercial actor.

In some implementations, while performing the group of actions, the first node may obtain the additional new commercial actor data from the set of distributed data sources to cause a particular amount of the digital currency to be provided to an account associated with a third entity that has added the additional new commercial actor data to the set of distributed data sources. In some implementations, while performing the group of actions, the first node may provide the additional new commercial actor data to the set of distributed data sources to cause nodes associated with other entities to obtain the additional new commercial actor data in exchange for a particular amount of the digital currency.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, the first node is able to facilitate the distribution of the commercial actor data in a manner that is secure, distributed, automated, and incentive-driven.

For example, security is provided by supporting the node with a tamper-resistant data structure (e.g., the node), by implementing various forms of authentication, by restricting access to the network of nodes to particular entities or parties, and/or the like. To provide a few particular examples, the node may improve security by preserving an immutable record of the commercial actor data, by using cryptographic links between blocks of the node (e.g., reducing the potential for unauthorized tampering with the commercial actor data), and/or the like. Security is further improved as a result of nodes that have access to the node independently verifying each transaction that is added to the node. Moreover, use of a node also provides failover protection, in that the first node may continue to operate in a situation where one or more other nodes that have access to the node fail.

Furthermore, by incentivizing entities to update the distributed file system with new commercial actor data, the commercial actor data may serve as a reliable indicator of credit worthiness of the commercial actor. Still further, the first node conserves processing resources and/or network resources and/or memory resources. For example, the first node conserves processing resources and/or network resources that might otherwise be used to query a set of credit bureau data sources to obtain commercial actor data of the commercial actor. As another example, by utilizing a distributed file system to store the commercial actor data, the network of nodes improves in scalability, and conserves memory resources that might otherwise be used to attempt to store the commercial actor data on the node.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

While there have been shown what are presently considered to be preferred embodiments of the present invention, it will be apparent to those skilled in the art that various changes and modifications can be made herein without departing from the scope and spirit of the invention.

What is claimed is:

1. A method for creating a secure and decentralized credit report, comprising the steps of:
   providing a network of nodes, comprising:
      a network node having a tamper resistant data structure,
      a plurality of networked nodes,
      a distributed filesystem that stores a plurality of commercial actor data, and
      wherein the network node restricts access to the distributed filesystem to the plurality of networked nodes;
   receiving a request on a first node of the plurality of networked nodes to access the commercial actor data on the distributed filesystem;
   authenticating the request;
   relaying the request to the network of nodes through the network node;
   receiving the request on a second node of the plurality of network nodes; and
   performing a function on the distributed filesystem in response to the request.

2. The method for creating a secure and decentralized credit report of claim 1, further comprising the step of obtaining a cryptographic key used to process the request.

3. The method for creating a secure and decentralized credit report of claim 2, wherein the cryptographic key is a public key used to encrypt data received in connection with the request, and wherein the encrypted data is stored on the distributed filesystem in response to the request.

4. The method for creating a secure and decentralized credit report of claim 2, wherein the cryptographic key is a private key used to decrypt data retrieved from the distributed filesystem in response to the request.

5. The method for creating a secure and decentralized credit report of claim 1, further comprising the steps of:
   receiving encrypted data in conjunction with the request;
   decrypting the data with a private key;
   obtaining a public key for entities authorized to access the data;
   encrypting the data with the private key;
   generating a set of storage identifiers for the data; and
   broadcasting the set of storage identifiers to the second node and other nodes of the plurality of networked nodes.

6. The method for creating a secure and decentralized credit report of claim 5, wherein the storage identifiers are generated as a cryptographic hash value identifying the storage location at which the data is to be stored within the distributed filesystem.

* * * * *